Nov. 28, 1967     C. M. LEWIS     3,354,665
CONDENSER FAN SPEED CONTROL
Filed Dec. 1, 1966
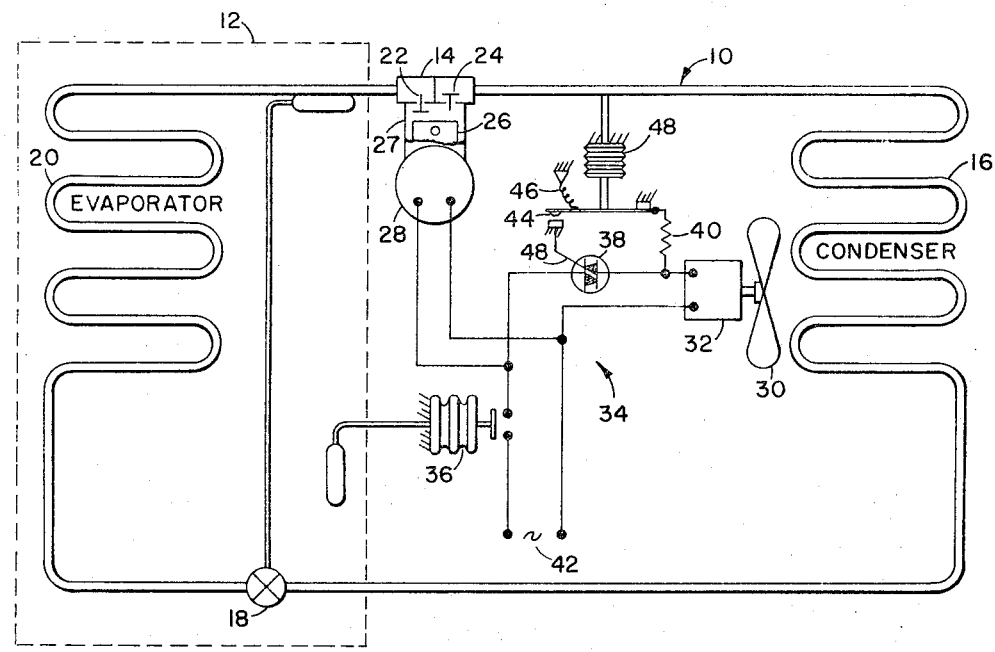
INVENTOR.
CARL M. LEWIS
BY Carl M. Lewis
ATTORNEY

United States Patent Office 3,354,665
Patented Nov. 28, 1967

3,354,665
CONDENSER FAN SPEED CONTROL
Carl M. Lewis, Onalaska, Wis., assignor to The Trane Company, La Crosse, Wis., a corporation of Wisconsin
Filed Dec. 1, 1966, Ser. No. 598,466
9 Claims. (Cl. 62—184)

ABSTRACT OF THE DISCLOSURE

An electric control circuit for a refrigerant condenser cooling fan motor having a symmetrical gated switch in series with the fan motor intermittently caused to conduct by a condenser pressure responsive mechanical switch having substantially no pressure differential.

Background of the invention

In the art of compression cycle refrigeration systems having air cooled condensers, it is known to control the condenser fan speed for the purpose of maintaining uniform pressure at the refrigerant throttling means despite variations in cooling air temperature and/or load on the condenser. Such condenser fan speed controls have taken several different forms. One scheme of control involves the use of a two speed fan motor which may be cycled from one discrete speed to another discrete speed as required. Such a system usually requires a switching mechanism for changing the number of active poles in the motor. While this scheme has found widespread use, it will be appreciated that it does not maintain the condenser pressure accurately because the control is by stages rather than by modulation. Further, because of the rather complicated switching requirements, this control is costly and has found little use in residential refrigeration systems.

Modulated condenser fan speed controls have been known for a number of years. These have the distinct advantage of more accurate control of condenser pressure. One form of such control involves the use of a condenser temperature responsive variable resistance in series with the fan motor such as disclosed in U.S. Patent 2,705,404. This control has the disadvantage of considerable power loss at the resistor. More recently various condenser fan speed controls such as shown in U.S. Patent 3,196,629 have been suggested which utilize a solid state switch caused to conduct only during a portion of each half cycle of the alternating current power source, the speed variation being obtained by varying the timing of that instant in each half cycle at which the solid state switch begins to conduct in response to the condenser temperature. Such systems require rather complex and expensive electronic circuitry for regulating the aforementioned timing and for this reason are not entirely suitable for low cost refrigeration applications.

Summary of the invention

The instant invention involves a scheme for obtaining variations in condenser fan speed by using a simple and inexpensive pressure responsive switch which is caused to flutter at the desired predetermined minimum condenser pressure, the rate of flutter being substantially less than the frequency of alternating current power source and yet sufficiently great that the fan speed is modulated. For this purpose a pressure switch having substantially no pressure differential, i.e. one which opens and closes at substantially the same pressure, is selected.

It will be appreciated that such a switch cannot be positioned to conduct a substantial portion of the fan motor current, as the contacts thereof would in a very short time become worn. Further, the welding and erosion at the contacts due to high current would prevent the switch from cycling or fluttering in a very narrow pressure range. In the instant invention the aforementioned low pressure differential switch is arranged to intermittently actuate a solid state switch means in series with the condenser fan motor. Accordingly, the instant invention causes the condenser fan motor to operate at a modulated speed by delivering to said motor pulses of alternating current, said pulses having a frequency substantially less than the frequency of said alternating current and sufficiently high to cause the fan speed to be modulated thereby avoiding discrete speed levels and the inaccurate pressure control associated therewith, as aforedescribed.

For a better understanding of my invention, reference may be had to the accompanying drawing, the single figure of which discloses schematically one embodiment of my invention.

Referring to the drawing, there is shown a refrigeration system 10 for cooling a conditioned space 12. Refrigeration system 10 includes a reciprocating refrigerant compressor 14, an air cooled refrigerant condenser 16, a refrigerant throttling means such as temperature responsive expansion valve 18, and refrigerant evaporator 20 respectively serially connected in a closed refrigerant loop or circuit. Compressor 14 includes a suction valve 22 for receiving refrigerant gas from evaporator 20 and a discharge valve 24 for discharging compressed refrigerant gas to condenser 16. Compressor 14 also includes a piston 26 for compressing refrigerant in a compression cylinder 27 communicating with valves 22 and 24. Piston 26 is reciprocally driven by electric motor 28.

Condenser cooling fan 30 is arranged to pass cooling air over condenser 16 and is driven by electric motor 32. Compressor motor 28 and fan motor 32 are connected to an electric control network 34 including a thermostatic switch 36 responsive to the temperature of conditioned space 12, a symmetrical gated switch 38, a current limiting device such as resistor 40, an alternating current power source 42, and a mechanically operated pressure responsive electric switch 44 arranged to be responsive to the high side pressure, i.e. that portion of the refrigerant circuit extending from compressor 14 through condenser 16 to throttling means 18, and preferably responsive to that portion of the refrigerant circuit adjacent the compressor. Pressure responsive switch 44 is provided with a spring 46 always biasing the contacts thereof toward an open position and a bellows actuator 48 to close said contacts upon sensing a predetermined pressure in the refrigerant high side. Switch 44 is, therefore, not snap acting and is constructed to open at a pressure of at least 98 percent of said predetermined pressure. Resistance 40 limits the current through switch 44 to a sufficiently low magnitude for long life of the contacts thereof. The current may be limited by resistor 40 to the magnitude of less than 100 milliamperes.

Electric control network 34 presents a first electric circuit serially connecting alternating current power source 42, thermostatic switch 36, symmetrical gated switch 38, and fan motor 32; a second electric circuit serially connecting alternating current power source 42, the gate 48 of said symmetrical gated switch 38, mechanically operated pressure responsive switch 44 and current limiting resistor 40; and a third electric circuit including alternating current power source 42, thermostatic switch 36, and compressor motor 28.

Operation

As the temperature in conditioned space 12 rises to a predetermined temperature, thermostatic switch 36 closes completing the aforesaid third circuit whereby compressor motor 28 is energized and the piston 26 of compressor 14 is caused to reciprocate in the cylinder 27.

On downward strokes of piston 26, refrigerant gas is drawn from evaporator 20 through suction valve 22 into cylinder 27. Upon the upward strokes of piston 26, the refrigerant gas is compressed and discharged by way of discharge valve 24 to condenser 16.

When the pressure builds up in condenser 16 to said desired predetermined minimum condensing pressure, bellows 48 expands against the bias of spring 46 to close the contact of switch 44 thereby energizing said second circuit which includes the gate 48 of symmetrical gated switch 38. Symmetrical gated switch 38 immediately conducts thus completing said first circuit including said fan motor 32 thereby starting rotation of fan 30. The cooling air delivered to condenser 16 by fan 30 before fan 30 reaches full speed, may be sufficient to reduce the pressure in condenser 16 and cause bellows 48 to contract and permit the contacts 44 to open under the bias of spring 46 thereby opening said second circuit which in turn opens said first circuit to de-energized motor 32 causing the fan 30 to coast. With a decreased amount of air passing over the condenser 16 as the fan 30 slows down, the pressure in condenser 16 rises. Prior to fan 30 stalling, the pressure in condenser 16 rises again to said desired predetermined minimum condensing pressure and the fan motor 32 is again energized. Because of the narrow pressure differential between which motor 32 is energized and de-energized, fan 30 operates for substantial periods in a speed range between full speed and no speed, effectively modulating the air flow over the condenser thereby maintaining with great accuracy the desirable predetermined minimum condensing pressure. Thus, the fan speed is modulated by the pulses of alternating current delivered to fan motor 32 by the cycling of switch 38. The frequency and duration of these pulses will vary with operating conditions and the design of the circuit elements. If desired, the pulses may be of a regular frequency such as by making switch 44 partially responsive to regular pressure changes, e.g. the discharge pulses of a reciprocating compressor. This may be accomplished in some cases by connecting pressure responsive switch 44 adjacent the compressor outlet. However, it will be appreciated that at least during a portion of the operation of fan 30, motor 32 receives pulses of alternating current which have a frequency less than the frequency of alternating current and greater than a frequency which would permit the fan to reach a steady condition such as full speed or no speed.

If the temperature of the cooling air and the load on the condenser are such that the fan, when operated at full speed, cannot reduce the condenser pressure below said desirable predetermined minimum pressure, fan 30 will operate at full speed. If the refrigeration system components are properly selected, the condenser pressure will not become excessive while fan 30 is operated at full speed.

Refrigerant condensate from condenser 16 is thus supplied at above said desirable predetermined minimum condensing pressure to expansion valve 18 whereupon it is throttled to a low pressure in evaporator 20. In this manner sufficient pressure is maintained on throttling means 18 so that it may respond accurately to meet the load on the evaporator especially when the condenser cooling air temperature or condenser load is low.

Having thus described in detail the preferred embodiment of my invention, I contemplate that many changes may be made without departing from the scope or spirit of my invention and I accordingly desire to be limited only by the following claims.

I claim:

1. A refrigeration apparatus comprising a refrigerant compressor; an air cooled refrigerant condenser; refrigerant throttling means; a refrigerant evaporator respectively serially connected in a closed refrigerant circuit wherein that portion of said refrigerant circuit extending from said compressor through said condenser to said throttling means is the high pressure side; a fan disposed to pass cooling air over said refrigerant condenser; an electric fan motor drivingly connected to said fan; a gated semiconductor switch; an alternating current power source; a first electric circuit serially connecting said alternating current power source, said gated semiconductor switch and said electric fan motor; a mechanically operated pressure responsive electric switch responsive to the pressure in said high pressure side of said refrigerant circuit; and a second electric circuit including said alternating current power source and the gate of said gated semiconductor switch; said mechanical pressure responsive electric switch being connected to control the electric current in said second electric circuit.

2. The apparatus as defined by claim 1 wherein said gated semiconductor switch is a symmetrical gated switch.

3. A refrigeration apparatus comprising a refrigerant compressor; an air cooled refrigerant condenser; refrigerant throttling means; a refrigerant evaporator respectively serially connected in a closed refrigerant circuit wherein that portion extending from said compressor through said condenser to said throttling means is the high pressure side of said refrigerant circuit; a fan disposed to pass cooling air over said refrigerant condenser; an electric motor drivingly connected to said fan; a gated semiconductor switch; an alternating current power source; a first electric circuit serially connecting said alternating current power source, said gated semiconductor switch and said electric motor; a mechanical pressure responsive electric switch responsive to the pressure in said high pressure side of said refrigerant circuit; a second electric circuit including in series said alternating current power source, said pressure responsive switch and the gate of said gated semiconductor switch.

4. The apparatus as defined by claim 3 wherein said gated semiconductor switch is a symmetrical gated switch.

5. A refrigeration apparatus comprising a refrigerant compressor; an air cooled refrigerant condenser; refrigerant throttling means; a refrigerant evaporator respectively serially connected in a closed refrigerant circuit wherein that portion of said refrigerant circuit extending from said compressor through said condenser to said throttling means is the high pressure side; a fan disposed to pass cooling air over said refrigerant condenser; an electric fan motor drivingly connected to said fan; a gated semiconductor switch; an alternating current power source; a first electric circuit serially connecting said alternating current power source, said gated semiconductor switch and said electric fan motor; a two position electric switch responsive to the pressure in said high pressure side of said refrigerant circuit; a second electric circuit including said alternating current power source and the gate of said gated semiconductor switch; said two position electric switch being connected to control the electric current in said second electric circuit; said two position switch having first and second discrete positions; means for maintaining said fan motor at a first speed condition when said two position switch is maintained indefinitely in said first discrete position and for maintaining said fan motor at a second speed condition which is less than said first speed condition when said two position switch is maintained indefinitely in said second discrete position; and means for cycling said two position switch between said first and second positions more frequently than said fan motor alternately attains said first and second motor speed conditions and less frequently than the frequency of said alternating current power source thereby effecting speed modulation of said fan in response to the pressure of the refrigerant in said high pressure side of said refrigerant circuit.

6. The apparatus as defined by claim 5 wherein said two position switch cycles between its first and second positions with substantially no pressure differential.

7. The apparatus as defined by claim 5 wherein the pressure at which said two position switch assumes its second position is more than 98 percent of the pressure at which said two position switch assumes its first position.

8. The apparatus as defined by claim 5 wherein said two position switch is a pressure responsive mechanical switch.

9. The apparatus as defined by claim 5 wherein said gated semiconductor switch is a symmetrical gated switch.

References Cited

UNITED STATES PATENTS 2,952,991   9/1960   St. Pierre _____ 62—184

WILLIAM J. WYE, *Primary Examiner.*